United States Patent
Breitbach et al.

[19]

[11] Patent Number: 6,123,293
[45] Date of Patent: Sep. 26, 2000

[54] ENGINE MOUNT, PARTICULARLY FOR A PROPELLER-DRIVEN AIRCRAFT, COMPRISING A TUBULAR FRAME STRUCTURE

[75] Inventors: Elmar J. Breitbach; Torsten Grützmacher, both of Göttingen, Germany

[73] Assignees: Deutsches Zentrum fur Luft-und Raumfahrt e.V., Bonn; ERAS GmbH, Gottingen, both of Germany

[21] Appl. No.: 09/053,464

[22] Filed: Apr. 1, 1998

[30] Foreign Application Priority Data

Apr. 1, 1997 [DE] Germany ............................ 197 13 365

[51] Int. Cl.$^7$ ................................................. B64D 27/00
[52] U.S. Cl. ............................................. 244/54; 248/554
[58] Field of Search ................................... 244/53 R, 54, 244/170, 17.27; 248/554, 555, 556, 557

[56] References Cited

U.S. PATENT DOCUMENTS

| | | |
|---|---|---|
| 2,257,940 | 10/1941 | Dornier . |
| 2,343,426 | 3/1944 | Tyler ........................................ 248/554 |
| 2,355,370 | 8/1944 | Frey ......................................... 248/554 |
| 2,359,822 | 10/1944 | Boss ......................................... 248/554 |
| 2,395,949 | 3/1946 | Wilkins ................................... 248/554 |
| 2,411,562 | 11/1946 | Thompson .............................. 248/554 |
| 2,589,539 | 3/1952 | Childress ................................ 244/54 |
| 2,965,338 | 12/1960 | McLean .................................. 248/554 |
| 4,531,694 | 7/1985 | Soloy ....................................... 244/54 |
| 5,746,391 | 5/1998 | Rodgers et al. ......................... 244/54 |

FOREIGN PATENT DOCUMENTS

| | | |
|---|---|---|
| 2309402 | 4/1976 | France . |
| 2698848 | 12/1992 | France . |
| 210040 | 5/1940 | Germany . |
| 697164 | 10/1940 | Germany . |
| 4008568 | 9/1990 | Germany . |
| 43 10 825 C1 | 7/1994 | Germany . |
| 19527514 | 1/1997 | Germany . |
| 47605 | 1/1940 | Netherlands . |

*Primary Examiner*—Galen L. Barefoot
*Attorney, Agent, or Firm*—Womble Carlyle Sandridge & Rice, PLLC

[57] ABSTRACT

An engine mount (1) is disclosed which is particularly suitable for a propeller-driven aircraft. The engine mount (1) comprises a tubular frame structure (3) for the attachment of an engine (4) to a supporting structure, particularly to a cowling box (2). The frame structure (3) comprises a multitude of point-shape connected and braced members (8), (11), (12), (13), (15), and is part surrounding the engine (4). The engine (4) is bolted to mounts at one end of the tubular frame structure (3) in the direction (5) of drive, and, at its other end in the direction (5) of drive, the tubular frame structure (3) is, in turn, bolted to mounts on the supporting structure. According to the invention at least one member of the tubular frame structure (3) is an active member (12) the length of which can be changed under control.

11 Claims, 3 Drawing Sheets

ENGINE MOUNT, PARTICULARLY FOR A PROPELLER-DRIVEN AIRCRAFT, COMPRISING A TUBULAR FRAME STRUCTURE

FIELD OF THE INVENTION

The invention is related to an engine mount, particularly for a propeller-driven aircraft, the engine mount comprising a tubular frame structure for the attachment of an engine to a supporting structure, in particular to a cowling box; the tubular frame structure comprising a multitude of point-shape connected and braced members arranged in V-shape for reciprocal stability, and the tubular frame structure surrounding the engine in part; the engine being bolted to mounts at one end of the tubular frame structure in the direction of drive; and the other end of the tubular frame structure being bolted to mounts on the supporting structure mounts.

BACKGROUND OF THE INVENTION

In short-range traffic, the performance of propeller-driven aircraft is basically always superior to jet-driven aircraft performance. Propeller-driven aircraft engines have shorter start-up requirements. They consume less fuel and in case of the short-range traffic mentioned above, they also have lower maintenance requirements than jet-driven aircraft. This means considerably lower maintenance costs on the whole.

Engine mounts of propeller-driven aircraft are, however, exposed to distinct interfering excitation which, in their entirety, result in a transmission of vibration to the supporting structure to which the respective engine mount is mounted. The vibrations extending via the supporting structure result in a considerable reduction of travelling comfort in propeller-driven aircraft. There is such a great difference in travelling comfort between propeller-driven and jet-driven aircraft that jet-driven aircraft is often actually used for short-range traffic in order to keep passengers and in order to prevent their availing themselves of the services of other airlines.

An engine mount as described at the beginning is known from DO 328 Regional Airliner, a propeller-driven aircraft manufactured by Dornier Luftfahrt GmbH, Germany. The engine is bolted to one end of the tubular frame structure by means of so-called shock mounts. The respective end of the tubular frame structure is made up of a so-called horse collar. The horse collar is connected with a U-shaped, vertically-arranged center frame, which is open at the base, by means of V-shape arranged members of the tubular frame structure. This center frame, in turn, is connected with a vertical frame made up of members of the tubular frame structure by members of the tubular frame structure arranged in a V-shape. At the top, this vertical frame is rigidly mounted to a cowling box. Further members of the tubular frame structure extend from the vertical frame backwards, and converge in a junction point, for which a mount. is provided at the cowling box for the absorption of vertical forces. Besides the engine being bolted to mounts at the horse collar, the engine is suspended at the center frame, this suspension tolerating the engine's thermal expansion towards the tubular frame structure. The shock mounts by means of which the engine is mounted to the horse collar are made up of elastomer materials and are to isolate the engine's vibrations from the tubular frame structure due to their deforming properties. The shock mounts must, however, not only be optimized with a view to their vibration-isolation properties. Their mechanical and thermal strains in engine operation must primarily be taken into account. Additional factors to be considered are the spontaneous increase in hardness during the shock mounts' service life as a consequence of these mechanical and thermal strains as well as external influences such as the weather, salt used for runway de-icing purposes and engine oil. All of these factors result in the shock mounts being subjected to an artificial aging process. The shock mounts' vibration isolation capacity is therefore insufficient even if shock mounts are replaced every 6,000 flying hours, as requested.

The invention not only refers to engine mounts for the attachment of an engine to a cowling box. In particular with a view to one-engine propeller-driven aircraft, the fuselage or its frame shall also be considered as a supporting structure for the engine. Engine mounts according to the invention are also suitable for jet-driven engines even if the problems mentioned above primarily occur in propeller-driven engines.

The invention is based on the task of providing an engine mount as described at the beginning which is particularly suitable for the purpose of active vibration isolation and which, at the same time, has a sufficient degree of passive stability (fail-safe) and is light-weight.

SUMMARY OF THE INVENTION

The present invention provides an engine mount, particularly for a propeller-driven aircraft, the engine mount comprising a tubular frame structure for the attachment of an engine to a supporting structure, particularly to a cowling box; the frame. structure comprising of a multitude of point-shape connected and brace members, and the frame structure in part surrounding the engine; the engine being bolted to mounts at one end of the tubular frame structure in the direction of drive, and, at its other end in the direction of drive, the tubular frame structure being, in turn, bolted to mounts on the supporting structure; wherein at least one member of the tubular frame structure is an active member the length of which can be changed under control.

For the purpose of active vibration isolation, no additional structural element is provided for in the new engine mount. Instead, an existing passive member of the tubular frame structure is replaced by an active member. The ability to regulate the length of this active member of the tubular frame structure provides the means for active vibration isolation of engine vibrations, which are caused by interfering excitation, from the supporting structure to which the engine mount is mounted. It is consciously accepted that engine vibrations are initially transmitted to the tubular frame structure. This means turning away from the traditional concept of directly isolating the engine from the tubular frame structure which is implicitly contained in the arrangement of the known shock mounts. As a consequence of torque resistant mount conditions, it is much easier to implement the vibration isolation in the tubular frame structure. In the tubular frame structure, engine vibrations are propagated as frame structure member vibration. They can specifically be compensated with an active member of the tubular frame structure the length of which can be regulated arbitrarily. Mainly longitudinal but also transversal vibrations of the active member and, thus, of the whole frame structure can actively be influenced by changes in the length of the active member.

Preferably, the at least one active member of the tubular frame structure is provided at such a point at which the tubular frame structure is subject to above-average dynamic extensions in engine operation. The interfering excitations are particularly easy to influence at the very point at which they are most noticeable. It is not mandatory, however, to provide for at least one active member of the tubular frame structure at the point where the tubular frame structure is subject to maximum passive extensions in engine operation. It suffices, if dynamic extensions caused by interfering excitation in engine operation arise at the respective point, which usually applies to all members of the frame structure in the engine mount. If the at least one active member of the tubular frame structure is to be arranged at that point where maximum dynamic extensions arise, it must be taken into account that only dynamic excitations connected to interfering excitation the resulting vibrations of which are to be isolated from the supporting structure are of interest. As a consequence, the entire dynamic system has to be assessed from a modal point of view.

As it has already been stated, vibrations are particularly easy to influence at points where their effects are visible. As a consequence, at least one active member of the tubular frame structure should preferably be provided at a point where the tubular frame structure is subject to noticeable dynamic extensions in engine operation caused by different interference modes. These different interference modes as well as interfering excitation by which the different interference modes are excited can thus actively be influenced with a view to their effects on the supporting structure by regulating the length of the active member of the tubular frame structure.

In practical tests, it has emerged that the at least one active member of the tubular frame structure is most effectively positioned in the direction of the power flux of the mount forces of the engine mount which apply to the supporting structure. In general, passive expansions are comparatively extensive here due to individual interfering excitation from the engine.

The tubular frame structure can be divided up by a center frame which is positioned perpendicular to the direction of drive. In this case, at least one active member of the tubular frame structure should preferably be positioned at a point of the tubular frame structure between the center frame and the supporting structure. Again, the present invention turns away from state-of-the-art technology according to which engine vibrations would have to be isolated from the tubular frame structure. In the invention, vibrations in the tubular frame structure are consciously accepted in order to have a particularly effective means of influencing the vibrations occurring.

Preferably, the at least one active member of the tubular frame structure should be designed for the application of immense forces with minor changes in the length. On the one hand, this is a prerequisite for the effectiveness of the active member of the tubular frame structure for the purpose of effective vibration isolation. On the other hand, only this basic design helps to achieve passive engine-mount properties which guarantee safety in an event of failure of active vibration isolation (fail-safe) even if this is associated with concessions in travelling comfort with regard to the state of the art.

A control unit which specifically regulates the length of the at least one active member of the tubular frame structure must be provided for the implementation of active vibration isolation. A basic control could be designed as a regulating unit which regulates the length of at least one active member of the tubular frame structure in such a way that the mount forces which apply to the supporting structure in a vertical direction remain constant. Passengers consider fluctuations in mount forces which apply to the supporting structure in a vertical direction to have a particularly unpleasant effect on travelling comfort.

A regulating unit of this kind is usually provided with a vibration sensor which indicates vibration excitations to be isolated or excitations of inference modes caused by them. The regulating unit regulates the length of the active member of the tubular frame structure with the frequency of the inference excitations. The amplitude of the change in length and its phase angle to the inference excitations can be varied phase-specifically in order to optimize vibration isolation at any time. The adjustment of the frequency of the change in the length of the active member of the tubular frame structure to the frequency of inference excitations or inference modes caused by them is in conformity with the principle of modal destructive interference for the purpose of supporting structure vibration isolation.

Any member of the tubular frame structure can be replaced by an active member of the tubular frame structure in order to isolate engine interfering excitations from the supporting structure. In this process, it could prove to be favourable if two members of the tubular frame structure mirror-symmetrically located to an engine-mount vertical center plane are replaced by active members of the tubular frame structure in order to be able to apply interference-excited force to this vertical center plane with the aid of active members of the tubular frame structure. It is particularly effective to use several active members of the tubular frame structure if different types of engine interference excitations are to be isolated from the supporting structure. In this case, at least one active member of the tubular frame structure for each direction in which varying mount forces apply to the supporting structure in engine operation should preferably be provided in the tubular frame structure. "For each direction" in this case either refers to each independent geometrical direction or to each independent interference-mode direction in the phase space. Several active members of the tubular frame structure will, however, only be required if there is a major distance between the points of dynamic extension in the engine-mount tubular frame structure caused by the individual interference modes and/or their frequencies.

The at least one active member of the tubular frame structure can be made up of two tube sections made of a carbon-fiber composite with paraxial unidirectional fibers. Those two tube sections will then be connected with each other by means of another tube section made of a carbon-fiber composite. This third tube section should cover at least part of the other two tube sections and should be provided with fibers which intersect at an angle to the axis of the member of the tubular frame structure. A biased controllable actuator shall be located between these two tube sections. Such an active member of the tubular frame structure is also known from German Patent 43 10 825 for the construction of adaptive framework structures. The structure of the member of the tubular frame structure is described in detail therein. Such an active member of the tubular frame structure does not have to be adapted for the purpose of integration into an engine-mount tubular frame structure according to the present invention.

Not only the active member of the tubular frame structure but all other members of the tubular frame structure can also consist of tube sections made of a carbon-fiber composite. The frame structure would thus gain a large degree of stability while also benefiting from this extremely light-weight form of construction. Weight can be reduced further if possible frame structure frames are also made of a carbon-fiber composite. This design not only has favourable weight-reduction properties but it also has favourable vibration-isolation properties. There is only a minor frame structure vibration mass which is particularly negligible in comparison with the engine's vibration mass. This is also a basic approach of the invention, i. e. instead of isolating vibrations between the engine and the tubular frame structure, the invention strives for isolating vibrations between the tubular frame structure and the supporting structure.

The invention allows to rigidly mount the engine to the tubular frame structure. Changes in the engine-mount vibration behaviour resulting from deteriorating shock-mount vibration elastic properties caused by the shock mounts being subjected to an artificial aging process can thus be prevented.

The at least one active member of the tubular frame structure provides the means for the isolation of structural-dynamic vibrations up to a frequency of 150 Hz. This means that structural-dynamic vibrations, vibrations known from propeller-driven aircraft in particular, will no longer be transmitted to the supporting structure. The tubular frame structure can be mounted to the supporting structure by means of at least one active interface which is provided with at least one controllable actuator for the purpose of more intensive higher-frequency acoustic vibration isolation. Preferably, lateral forces will be reduced mechanically in the interface in order to prevent the actuator from being strained with shearing forces. An interface which is particularly suitable for mounting the frame structure to the supporting structure is known from German Patent Application 195 27 514, for example. This interface could help improve isolation properties concerning acoustic vibrations exceeding 150 Hz, i. e. sound conducted through solids. Travelling comfort in propeller-driven aircraft could thus be improved further.

BRIEF DESCRIPTION OF THE DRAWINGS

The invention will be illustrated and described in further detail by means of preferred embodiments. In the drawings

DETAILED DESCRIPTION OF THE PREFERRED EMBODIMENTS

Figure 1:
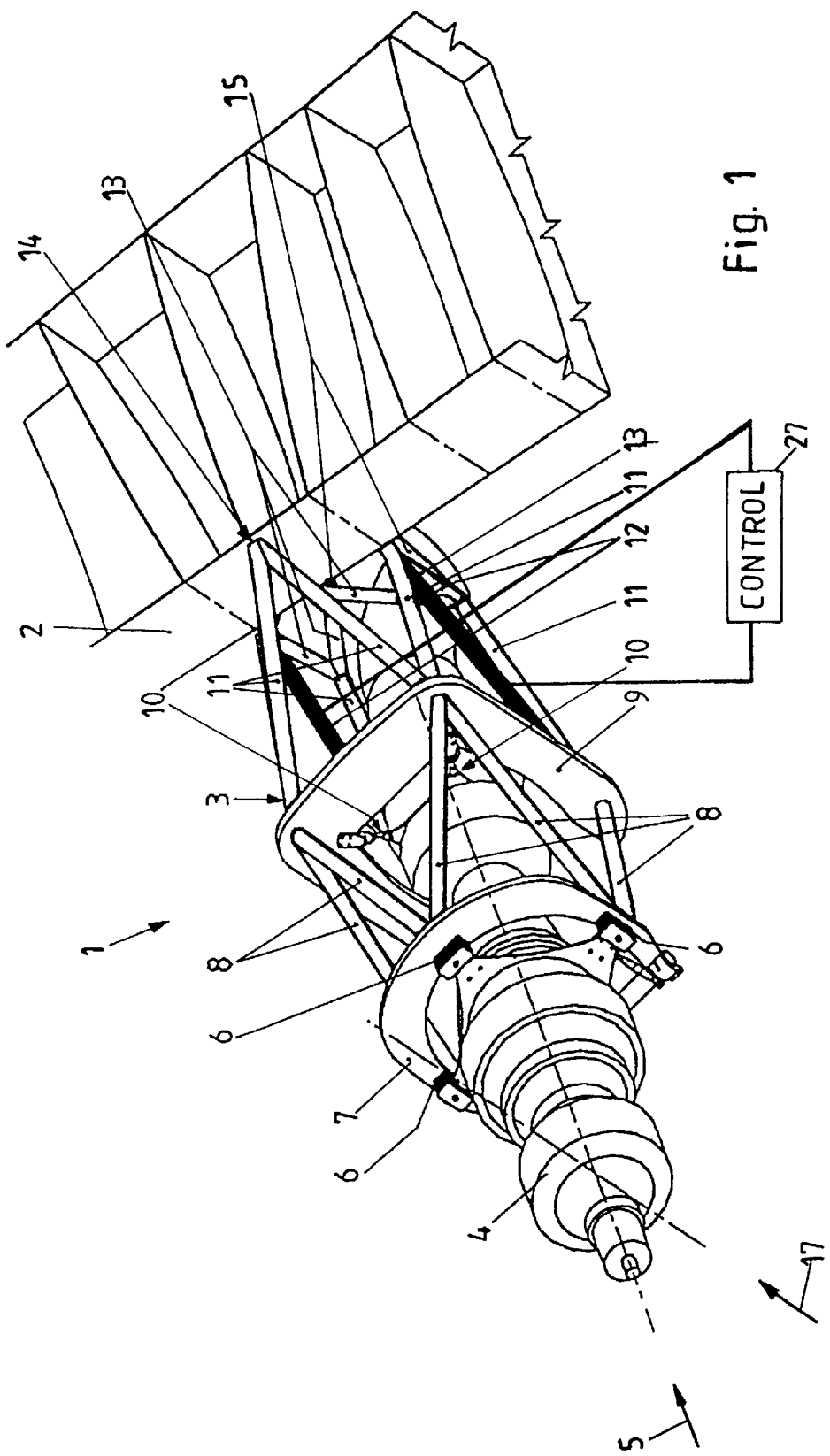
FIG. 1 is a perspective view of the engine mount suspended to a cowling box with a tubular frame structure, and of the engine.

The engine mount 1 illustrated in FIG. 1 is suspended to a cowling box 2. The engine mount 1 consists of a tubular frame structure 3 which is bolted to mounts on cowling box 2 and on which, in turn, an engine 4 is bolted to mounts. A part of the engine 4 extends to the inside of the tubular frame structure 3. According to the direction of drive 5 of engine 4, the engine 4 is mounted to the tubular frame structure at the front end of the tubular frame structure 3 by means of so-called shock mounts 6. The shock mounts 6 are made of an elastomer material and have a certain degree of vibration-isolation properties suitable for isolating vibrations of the engine 4 from the tubular frame structure 3. For the purpose of active vibration isolation according to the present invention, this isolation of vibration is not necessarily required in the tubular frame structure 3 but it would be advantageous with a view to the passive properties of the engine mount 1. The front end of the tubular frame structure 3 is referred to as a horse collar 7 due to its shape. Six members of the tubular frame structure 8 extend, in a V-shape arrangement, backwards towards a center frame 9. At the center frame 9 a suspension 10 is provided for the engine 4. This suspension 10, however, tolerates the engine's thermal expansion towards the tubular frame structure 3 in its direction of drive. From the U-shaped center frame 9 which is open at the bottom, a total of eight members 11 and 12 of the tubular frame structure extend, in a V-shaped arrangement, backwards up to the leading edge of cowling box 2. There is another vertical frame made up of members of the frame structure 13 at the leading edge of cowling box 2. On the one hand, this frame is rigidly mounted to the leading edge of the cowling box 2 at a junction point 14 of members of the tubular frame structure. On the other hand, this frame is supported on the bottom side of the cowling box 2 by means of members 15 of the tubular frame structure at their junction point. From an overall point of view, the members 8, 11, 12, 13 and 15 of the tubular frame structure are point-shape connected in the area of the vertical frames and the braces of these members are arranged in a V-shape for reciprocal stability.

For the purpose of isolation of interfering excitation by the engine 4 in a vertical direction 17, the two members 12 of the tubular frame structure 3 are provided as active members. The length of these active members 12 of the tubular frame structure 3 can be regulated by a control unit 27. The two members of the tubular frame structure 12 are located in an area in which interfering excitations by the engine 4 in the vertical direction 17 become particularly noticeable as a result of passive changes in the length of the tubular frame structure 3. They are not, however, fully oriented towards the vertical direction 17.

Figure 2:
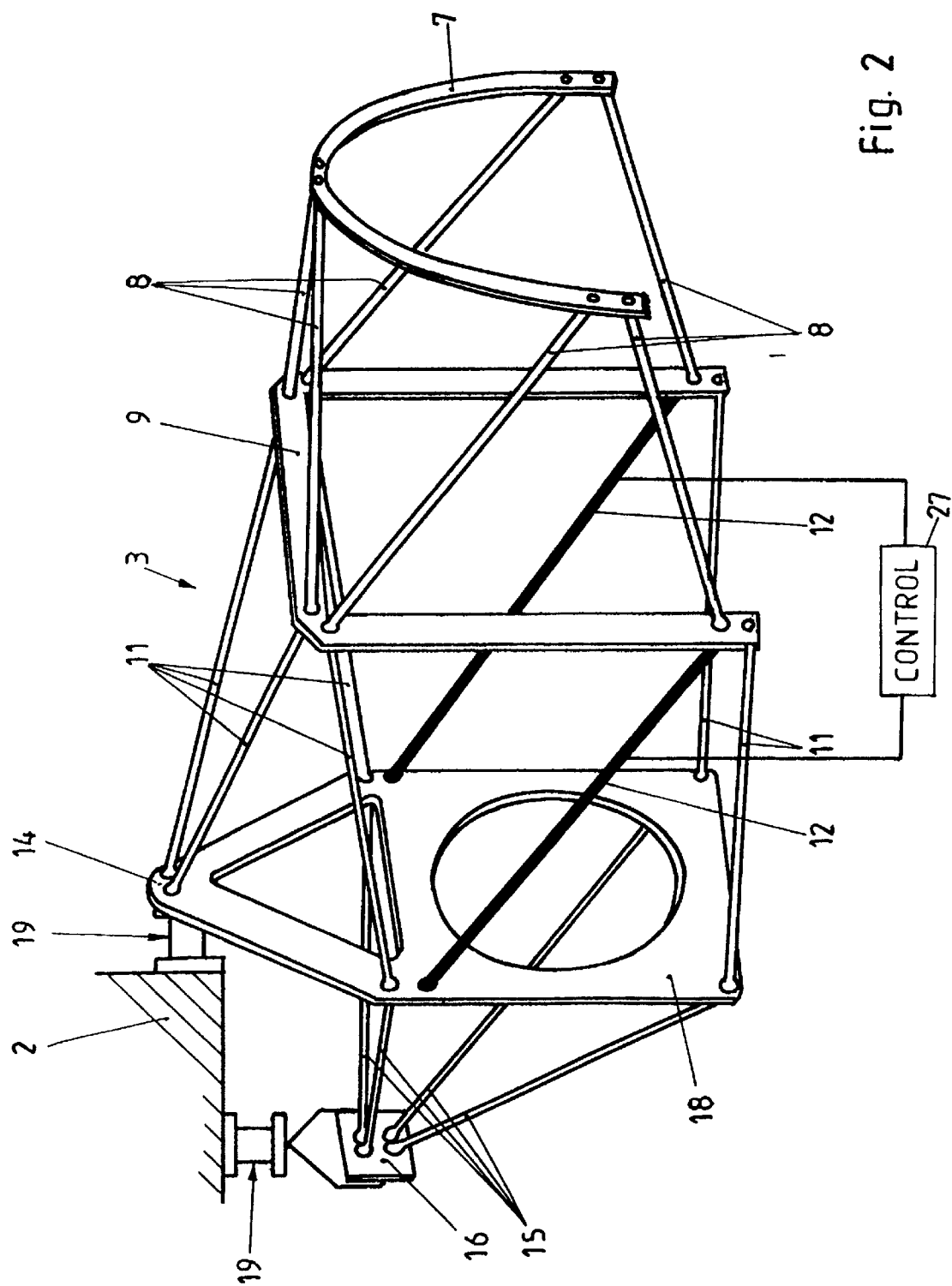
FIG. 2 is a diagrammatic perspective elevation of a modified embodiment of the tubular frame structure pursuant to FIG. 1.

The difference between the modified embodiment of the tubular frame structure 3 illustrated in FIG. 2 and the embodiment pursuant to FIG. 1 is that a genuine rear frame 18 is provided instead of the members 13 of the tubular frame structure. With the rear frame 18 the ends of all members 8, 11, 12 and 15 of the tubular frame structure 3 can be mounted to a vertical frame, horse collar 7, center frame 9, frame 18 or the junction point of members of the tubular frame structure 16. As a consequence, a carbon-fiber-composite tube-section design can be used for all members of the tubular frame structure in the tubular frame structure 3 right to the respective ends of the members of the tubular frame structure in order to implement a particularly light-weight tubular frame structure 3. Horse collar 7, center frame 9, frame 18 and the junction point of members of the tubular frame structure 16 can also be made of carbon-fiber composite parts. Another difference between this embodiment and the embodiment illustrated in FIG. 1 is that adaptive interfaces 19 are provided at points at which the tubular frame structure 3 is mounted to the cowling box 2, i.e. between the junction points 14 and 16 of the members 14 of the tubular frame structure and the cowling box 2. The adaptive interfaces 19 are illustrated schematically. The interfaces 19 serve to isolate vibrations of the engine 4 pursuant to FIG. 1 from the cowling box 2 to a further extent. While the active members 12 of the tubular frame structure are mainly suitable for the isolation of low-frequency vibrations up to 100 Hz, the interfaces 19 are designed especially for the isolation of higher-frequency vibrations. the control unit 27 is provided for controlling the active members 12 of the tubular frame structure 3 and the adaptive interfaces 27. This control unit 27 can include acceleration sensors at the engine, the frame structure and/or the cowling box, which are not shown here.

It has been proved in model calculations that it is actually possible to completely isolate the effects of interfering forces resulting in vibrations of the engine 4 up to a frequency of approximately 100 Hz from the cowling box 2 in the vertical direction by adequately controlling the two symmetrically arranged active members 12 of the tubular frame structure 3.

Figure 3:
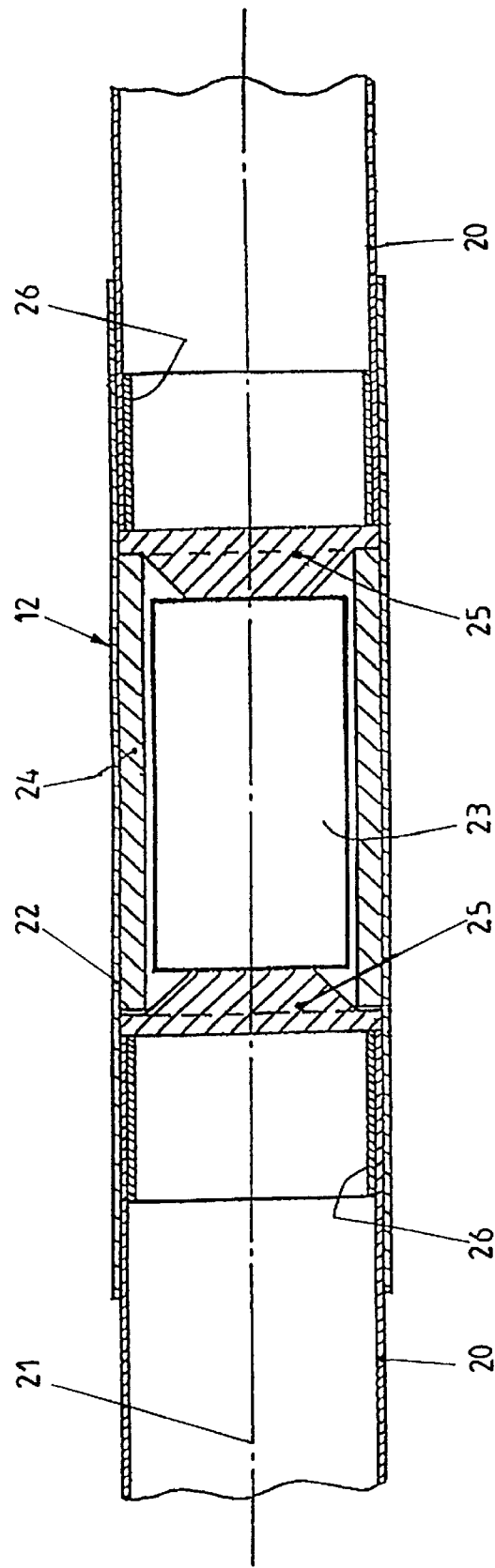
FIG. 3 is a longitudinal section of an active member of the tubular frame structure pursuant to FIGS. 1 or 2.

FIG. 3 illustrates a cross section of one of the two active members 12 of the tubular frame structure. Only the center area of the active member 12 of the tubular frame structure is shown, however. The active member 12 of the tubular frame structure comprises two tube sections 20 made of a carbon-fiber composite. The tube sections 20 comprise paraxial unidirectional fibers, i.e. unidirectional fibers oriented in parallel to the axis 21 of the member 12 of the tubular frame structure. The two tube sections 20 are connected with another by means of tube section 22 which partly laps over the two tube sections 20. Tube section 22 comprises fibers spiralling around the axis 21 in two opposite, intersecting directions. Inside the tube section 22 and in between the tube sections 20, there is a controllable actuator 23. The controllable actuator 23 is positioned inside a mount sleeve and is pre-stressed with a bias force by one power transmission pieces 25 at each end. The bias fore is applied by tube section 22 and applies to the power transmission pieces 25 by means of the exposed ends of the tube sections 20. The exposed ends of tube sections 20 are reinforced with reinforcing sleeves 26. The actuator 23 can be a so-called stack actuator which can cause a change in the length of the entire member of the tubular frame structure 12 of tens of μm. Details on the active member of the tubular frame structure illustrated in FIG. 3 are known from German Patent 43 10 825.

Reference List

1—engine mount
2—cowling box
3—tubular frame structure
4—engine
5—direction of drive
6—shock mount
7—horse collar
8—member of the frame structure
9—center frame
10—suspension
11—member of the frame structure
12—active member of the frame structure
13—member of the frame structure
14—junction point of members of the frame structure
15—member of the frame structure
16—junction point of members of the frame structure
17—vertical direction
18—frame
19—interface
20—tube section
21—axis of a member of the frame structure
22—tube section
23—actuator
24—mount sleeve
25—power transmission piece
26—reinforcing sleeve
27—control unit

What is claimed is:

1. An engine mount, particularly for a propeller-driven aircraft, the engine mount comprising a tubular frame structure for the attachment of an engine to a supporting structure, particularly to a cowling box; the tubular frame structure comprised of a multitude of point-shape connected and braced members, at least one member of the tubular frame structure is an active member, the length of which can be changed under control, and the frame structure in part surrounding the engine; the engine being bolted to mounts at one end of the tubular frame structure in the direction of drive, and, at its other end in the direction of drive, the tubular frame structure being, in turn, bolted to mounts on the supporting structure by means of at least one active interface which has at least one controllable actuator.

2. The engine mount according to claim 1, wherein the at least one active member of the tubular frame structure is provided at a point where the tubular frame structure is subject to above-average dynamic extensions in the operation of the engine.

3. The engine mount according to claim 2, wherein the at least one active member of the tubular frame structure is provided at a point where the frame structure is subject to dynamic extensions caused by different interfering excitation in the operation of the engine.

4. The engine mount according to claim 1, wherein the at least one active member of the tubular frame structure is orientated in the direction of power flux of the mount forces applying to the supporting structure.

5. The engine mount according to claim 1, wherein the tubular frame structure is, in the engine's direction of drive, divided by a center frame which is orientated perpendicular to the direction of drive, the at least one active member of the tubular frame structure being located in that division of the tubular frame structure neighbouring the supporting structure.

6. The engine mount according to claim 1, wherein the at least one active member of the tubular frame structure is designed for the application of immense forces with minor changes in the length.

7. The engine mount according to claim 1, wherein a control unit is provided which controls the length of the at least one active member of the tubular frame structure in such a way that the mount forces applying to the supporting structure in a vertical direction remain constant.

8. The engine mount according to claim 1, wherein at least one active member of the tubular frame structure is provided in the tubular frame structure for each direction in which varying mount forces apply to the supporting structure in the operation of the engine.

9. The engine mount according to claim 1, wherein the at least one active member of the tubular frame structure consists of two tube sections made of a carbon-fiber composite with paraxial unidirectional fibers, the two tube sections being connected by means of another tube section made of a carbon-fiber composite which laps over at least part of the two tube sections and whose fibers intersect at an angle to the axis of the member of the tubular frame structure and a biased controllable actuator being located between the two tube sections.

10. The engine mount according to claim 9, wherein all members of the tubular frame structure consist of tube sections which are made of a carbon-fiber composite.

11. The engine mount according to claim 1, wherein the engine is rigidly mounted to the tubular frame structure.

* * * * *